United States Patent [19]

Strnad, Jr.

[11] Patent Number: 5,163,473
[45] Date of Patent: Nov. 17, 1992

[54] VALVE SYSTEM FOR AUTOMATIC FUEL DELIVERY

[76] Inventor: Rudolph A. Strnad, Jr., 7 Cromwell Ct., Rancho Mirage, Calif. 92270

[21] Appl. No.: 624,374

[22] Filed: Dec. 7, 1990

[51] Int. Cl.$^5$ ............................................ B60K 15/035
[52] U.S. Cl. .................................... 137/588; 280/834; 251/14; 251/30.01; 251/294
[58] Field of Search ................ 137/587, 588; 280/834; 251/14, 30.01, 63.4, 294

[56] References Cited

U.S. PATENT DOCUMENTS

| | | | |
|---|---|---|---|
| 2,620,822 | 12/1952 | Peterson et al. | 137/588 |
| 2,997,102 | 8/1961 | Stearns | 137/588 X |
| 3,874,471 | 4/1975 | Kloefkom | 137/588 |
| 4,185,844 | 1/1980 | Hubbard et al. | 280/834 |
| 4,475,710 | 10/1984 | Leupers | 251/30.01 |
| 4,544,128 | 10/1985 | Kolchinsky et al. | 251/30.01 |
| 4,881,578 | 11/1989 | Rich et al. | 137/588 X |
| 5,058,693 | 10/1991 | Murdock et al. | 280/834 |

Primary Examiner—John Rivell
Attorney, Agent, or Firm—Lyon & Lyon

[57] ABSTRACT

A valve system for use on vehicles for automatic fuel delivery to the vehicle fuel tank. An entry member having a conical passage is arranged on the fuel filler door of the vehicle. A valve body located behind the fuel filler door includes a sliding valve member which alternatively opens and closes a central passageway coupled with the vehicle fuel tank. An actuator system employs an actuation switch as well as a safety switch requiring the ignition of the vehicle to be off. Compressed air is controlled by the switch to open and close the valve member through a control cable. An automatic delivery system is associated with the valve system and employs three tracks orthogonally arranged with one track mounting a fuel nozzle to interact with the valve system.

12 Claims, 3 Drawing Sheets

VALVE SYSTEM FOR AUTOMATIC FUEL DELIVERY

BACKGROUND OF THE INVENTION

The field of the present invention is automatic fuel systems for vehicles.

With the advent of more economically designed and operated service stations, assistance with fueling of passenger vehicles is becoming more difficult to find and more expensive in some locations. Some customers are not interested in or are unable to fuel their own vehicle. Consequently, a need has arisen for the automatic fueling of vehicles without substantial operator intervention.

Automatic fuel filling of vehicles has been contemplated. Such an automatic system is disclosed in Horvath et al., U.S. Pat. No. 4,681,144. In this device, fuel is introduced upwardly from below the tank through a special attachment. The driver positions the vehicle in place over the filling mechanism which then finally determines the location of the port on the bottom side of the fuel tank. A reflective surface about the port cooperates with photosensors on the fueling device to finally locate the filler port. Special gas tanks, special fueling ports and complicated below-grade fuel filling systems are required for this mechanism.

In Europe, above-grade automatic systems have been contemplated. A robotic arm senses the location of the fuel tank filler port. A fuel filler door is positioned on the body of the vehicle with an opening that is engaged by the filler mechanism. The door is pivoted to expose the fuel intake. A fuel tank cap having a special valve therein is employed behind the door such that once the door is pivoted to the open position, the nozzle may be inserted through the valve in the cap for filling.

To date, there has been no substantial commercial introduction of automatic fueling systems. The substantial investment, the complication of contemplated systems, the standardization of equipment and the cost of retrofit pose some of the problems facing any such commercial exploitation with the systems previously existing.

SUMMARY OF THE INVENTION

The present invention is directed to a system for automatic fuel delivery to vehicles.

In a first aspect of the present invention, a filling system is located directly on the surface of the body and includes an entry port with a valve which may be actuated by the vehicle operator. The valve may be arranged to both admit fuel and provide for vapor return.

An entry member may provide a conical port for the receipt of an automatic fueling system in this first aspect of the present invention. This port would extend through the body of the vehicle to be coupled with a fuel tank through a valve body. The valve body would include a vapor return passage which communicates with the fuel intake passage adjacent to the valve.

An automatic actuator may be controlled by the vehicle operator to open and close the valve system. A manual override may be provided to a pneumatically actuated mechanism. Dual switches may be incorporated in series with one switch being closed when the ignition switch of the vehicle is open.

A slide valve member may be employed for use in the system. The slide valve member would be positioned relative to the vapor return passage such that control of the vapor return passage is also achieved with control of the fuel intake passageway.

The valve system may be positioned in the fuel filler door of the vehicle. Such an arrangement provides for access behind the valve through opening of the filler door. Additionally, retrofit of existing vehicles becomes relatively easy.

In a second aspect of the present invention, a three track system is used to mechanically orient and advance a nozzle to the vehicle entry port. A sensor system associated with the nozzle can then locate a sending unit or a reflective unit and direct the nozzle to the entry port. A pay point may be provided through a vehicle data link, an outside operator or a mobile console for approaching the driver's window.

Accordingly, it is an object of the present invention to provide improved automatic fuel filling mechanisms. Other and further objects and advantages will appear hereinafter.

BRIEF DESCRIPTION OF THE DRAWINGS

FIG. 7 is a schematic enabling circuit for the actuator.

DETAILED DESCRIPTION OF THE PREFERRED EMBODIMENT

Figure 1:
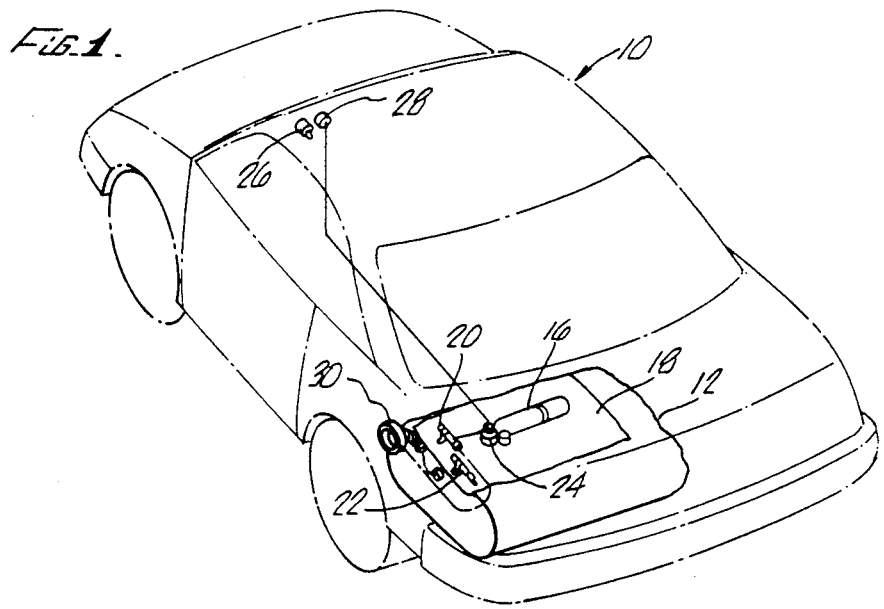
FIG. 1 is a perspective view of a system of the present invention with a vehicle illustrated in phantom associated therewith.

Turning in detail to the drawings, a vehicle 10 is illustrated in phantom in FIG. 1. Associated with the vehicle 10 is a fuel tank 12 conventionally located at the rear of the vehicle at the lower level of the body. A conventional filler pipe 14 extends upwardly from the tank 12. An air tank 16 is illustrated as being mounted to the trunk floor 18 of the vehicle 10. This mounting of the air tank 16 and its location are substantially for convenience of installation. Automatic access to the tank through the filler pipe 14 is provided through a pneumatic cylinder 20 coupled with the air tank 16. A manual actuator 22 is located adjacent the pneumatic cylinder 20. The pneumatic cylinder 20 and the manual actuator 22 are also shown to be located on the floor of the trunk 18. However, these may be conveniently located elsewhere. The air tank 16 is shown to include a solenoid valve 24 coupled to an ignition switch 26 and a manual switch 28.

Looking in detail to the components, an entry member 30 is shown positioned on a fuel filler door 32 of the body 10. A hole has been provided through the fuel filler door 32 to receive the entry member 30.

The entry member 30 includes a radially extending flange 34 which extends over the fuel filler door 32 about the hole. The entry member also includes a conically shaped passage 36 designed to receive the nozzle of an automatic fueling system. The conical nature of the passage 36 allows some degree of flexibility in the accuracy of the automatic fueling system to locate the inlet. A hard rubber lining 38 may be employed to reduce impact and wear. Additionally, the lining 38 in the conical passage 36 may act as an antenna or surface distinction sensed by the automatic fueling system as a mechanism for locating the inlet to the fuel tank 12.

Securely fastened to the entry member 30 is a valve body 40. The valve body 40 includes a cylindrical attachment element 42 having an inwardly extending attachment flange 44 to abut against the inside of the fuel filler door 32. A resilient gasket 46 positioned between the flange 34 and the hole through the fuel filler door 32, the flange 34 and the flange 44 cooperate to retain the valve system in position. Fasteners (not shown) extending through the valve body 40 and into the entry member 30 retain the components in a mutually compressed state about the hole in the fuel filler door 32. The valve body 40 includes a fuel filler passageway 48 extending centrally therethrough.

Extending laterally across this fuel filler passageway 48 is a slot 50. The slot 50 extends across the full width of the valve body 40 excluding the cylindrical attachment element 42. The passageway 48 extends directly across the slot 50 and terminates in the entry hole 52 in the entry member 30. The entry hole 52 and the passageway 48 are conveniently of the same circular cross section.

Located in the slot 50 is a valve member 54. The valve member 54 includes a hole 56 extending therethrough. This hole 56 has the same cross section as the passageway 48. The valve member 54 is arranged to slide such that the hole 56 can become aligned with the passageway 48. Alternatively, a blank portion of the valve member 54 is also positionable over the passageway 48 to completely cover over the intake. The valve member 54 is substantially shorter than the slot 50 such that sliding movement of the valve member 54 allows selection of either the hole 56 or the blank portion as positioned over the passageway 48. To seal the valve member 54 about the passageway 48, a circular seal 58 is positioned in the underside of the entry member 30.

Inwardly of the vehicle on the valve body 40 is a first hose fitting 60. This hose fitting 60 has an upraised conical bead 62 about its end for positive retention of a flexible fuel intake hose 64.

The fuel intake hose 64 may be held in place on the hose fitting 60 by means of a hose clamp 66. This hose 64 extends for 6 to 8 inches toward the fuel tank. Outwardly of the hose fitting 60 is a second hose fitting 68. This second hose fitting 68 is conveniently concentrically arranged with the hose fitting 60 and includes a similar bead 70. A flexible fuel intake hose 72 is associated with the hose fitting 68 and is held in place by a hose clamp 74. The flexible fuel intake hose 72 may extend to the tank 12 or be coupled with a pre-existing fuel filler pipe 14 as shown in FIG. 1. The flexible fuel intake hose 64 extends a portion of the way through the flexible fuel intake hose 72 to create an annular passage which performs as a vapor return passage 76. The vapor return passage 76 terminates in two holes 78 which each extend through the body of the valve body 40 to the slot 50. Channels 80 communicate the holes 78 to the passageway 48 immediately below and open to the slot 50. Similar channels 82 exist on the underside of the valve member 54 such that they will match up with the channels 80 when the valve member 54 is positioned with the hole 56 aligned with the passageway 48. Thus, as fuel is introduced by an automatic filler system which is contemplated to extend well past the valve member 54, vapor from the tank displaced by the incoming fuel may flow about the annular vapor return passage 76, through the holes 78 and the passage defined by the channels 80 and 82 to exhaust into the passageway upstream of the fuel discharge from the nozzle.

A valve actuator system can be employed to automatically control the valve member 54. The system may be run electrically or off manifold vacuum from the engine. The use of the air tank 16 has been contemplated as a useful retrofit design. The air tank 16 is controlled by a solenoid valve 24 which selectively directs pneumatic pressure through a line 84 to a pneumatic cylinder 20. To control the valve 24, an electrical circuit is contemplated as seen in FIG. 7. The electrical circuit includes the vehicle battery 86, the solenoid 24, the ignition switch 26 and the manual switch 28. The manual switch 28 is simply actuated when the vehicle operator desires to have the valve system open for filling. The ignition switch 26 operates in reverse to the actual ignition of the vehicle in that turning on the ignition opens the ignition switch 26 while disabling the ignition closes the ignition switch 26. In this way, manual selection is achieved while opening of the fuel port is prevented with the engine running.

Figure 2:
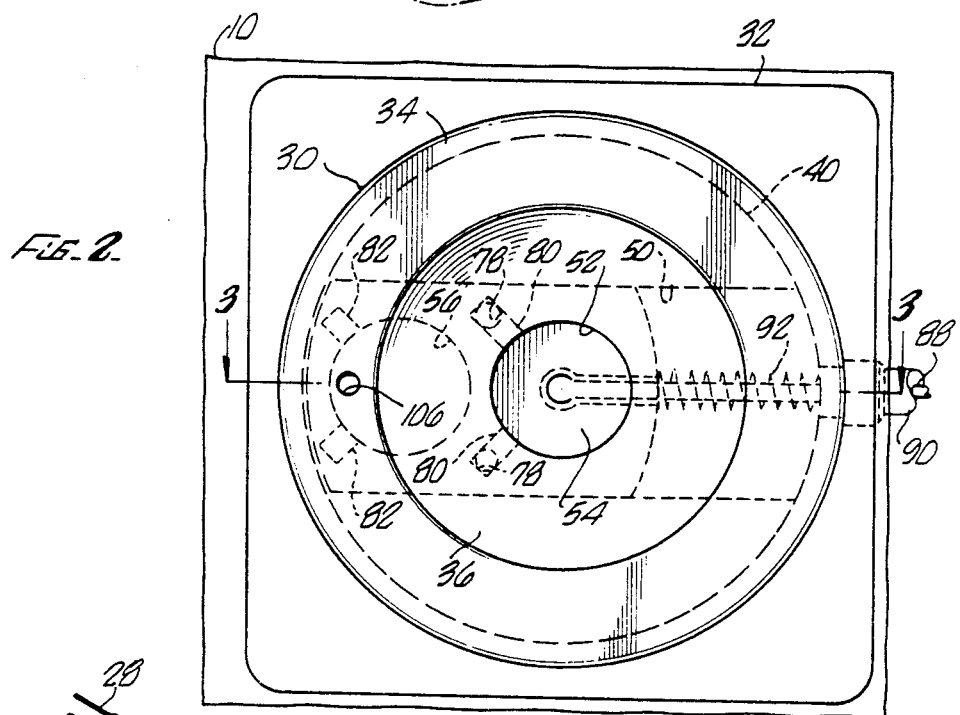
FIG. 2 is a plan view of the valve system of the present invention.
Figure 1:
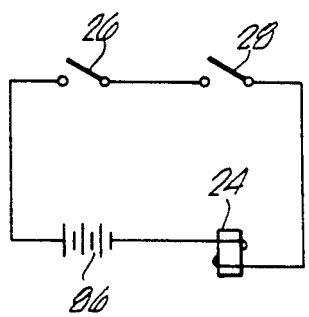
Figure 3:
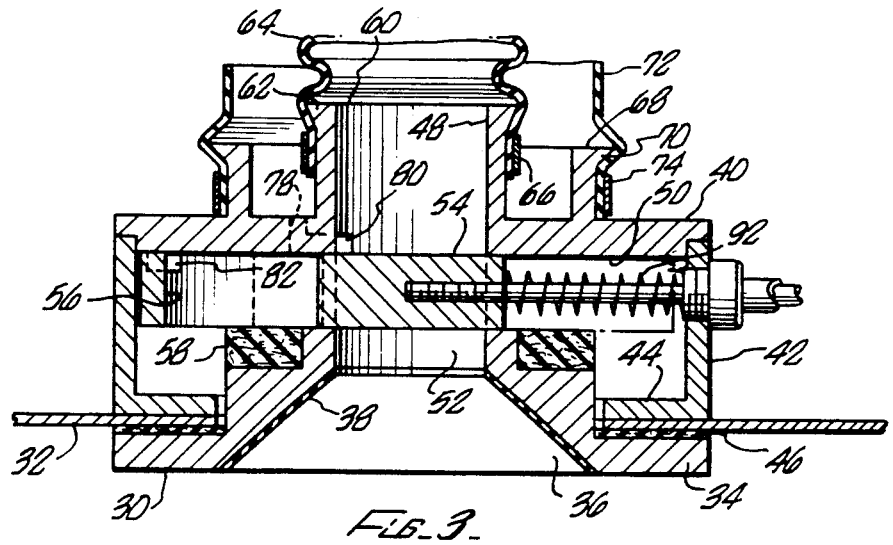
FIG. 3 is a cross-sectional side view of the device of FIG. 2.
Figure 4:
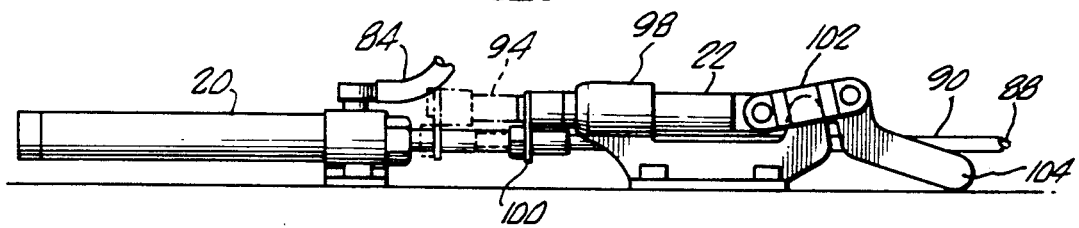
FIG. 4 is a side view of an actuator in the closed mode with an open mode illustrated in phantom.

As can be seen in FIG. 2, a control cable 88 having a sheath 90 is attached to the valve mechanism. The control cable 88 is coupled with the valve member 54 while the sheath 90 is coupled with the valve body 40. A spring 92 is positioned about the cable 88 to bias the valve member 54 toward the closed position. The other end of the control cable 88 with its sheath 90 is associated with the pneumatic cylinder 20. The cylinder is coupled by the pneumatic line 84 to the air tank 16 as controlled by the solenoid valve 24. The pneumatic cylinder 20 includes a spring to bias the piston therein in a first direction which is toward the closed position of the valve member 54. The air pressure operates against this spring to place tension on the control cable 88 to open the valve member 54.

Figure 5:
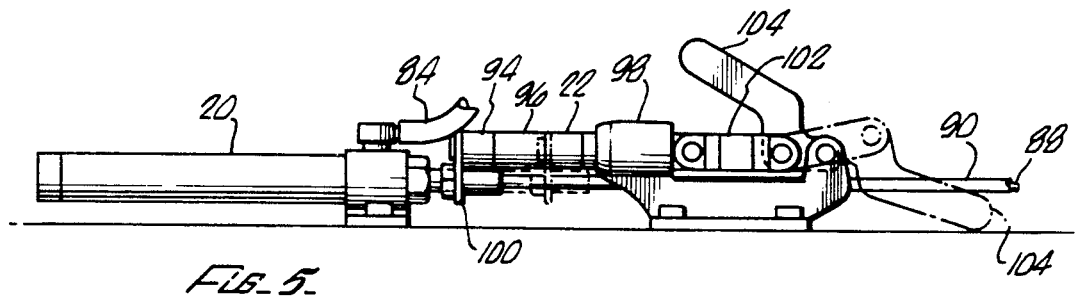
FIG. 5 is a side view of an actuator with the manual override shown retained in the open position and with the closed position shown in phantom.
Figure 6:
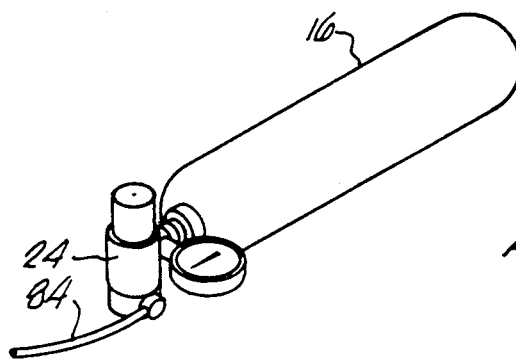
FIG. 6 is a perspective view of an air tank and valve system for actuating the devices of FIGS. 4 and 5.

Operating in parallel to this automatic actuator system is a manual actuator 22. The manual actuator 22 includes a lost motion mechanism which allows the automatic actuator to operate unimpeded. In this regard, a rod 94 is telescoped into a cylindrical tube 96. As the automatic actuator opens the valve member 54, the rod 94 is extracted from the tube 96 toward the pneumatic cylinder 20. The tube 96 is slidably mounted in a bracket 98 such that the tube 96 can be slid toward the pneumatic cylinder 20. A plate 100 couples the rod 94 with the end of the control cable 88 such that sliding of the tube 96 and, in turn, the rod 94 actuates the valve member 54. To actuate the tube 96, an overcenter linkage 102 is arranged on the bracket 98 with a handle 104 to manually actuate same. The manual actuation is illustrated in FIG. 5.

A fiber optic element 106 may be used in place of the surface antenna 38 mentioned above. The element 106 would draw light from the brake lamp to a fixed and standardized position adjacent the entry hole 52. The nozzle of the automatic fueling system might be designed to rapidly shut off and retract if the light goes off. This would provide an added safety feature for avoiding damage to the automatic fueling system. The element 106 need not necessarily respond to the brake.

The element 106 may be a light or diode for conveying digital or other on/off information. A light may be responsive to the status of the fuel port itself.

Figure 8:
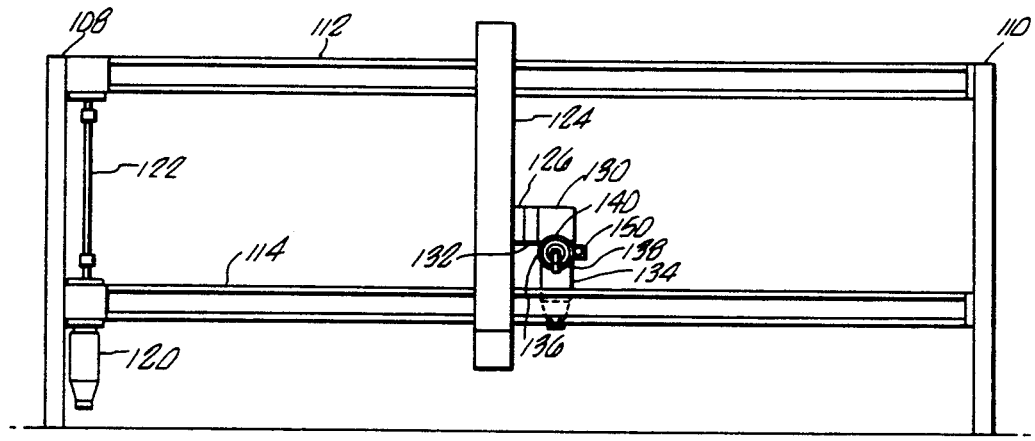
FIG. 8 is a front view of a fuel filling system.
Figure 9:
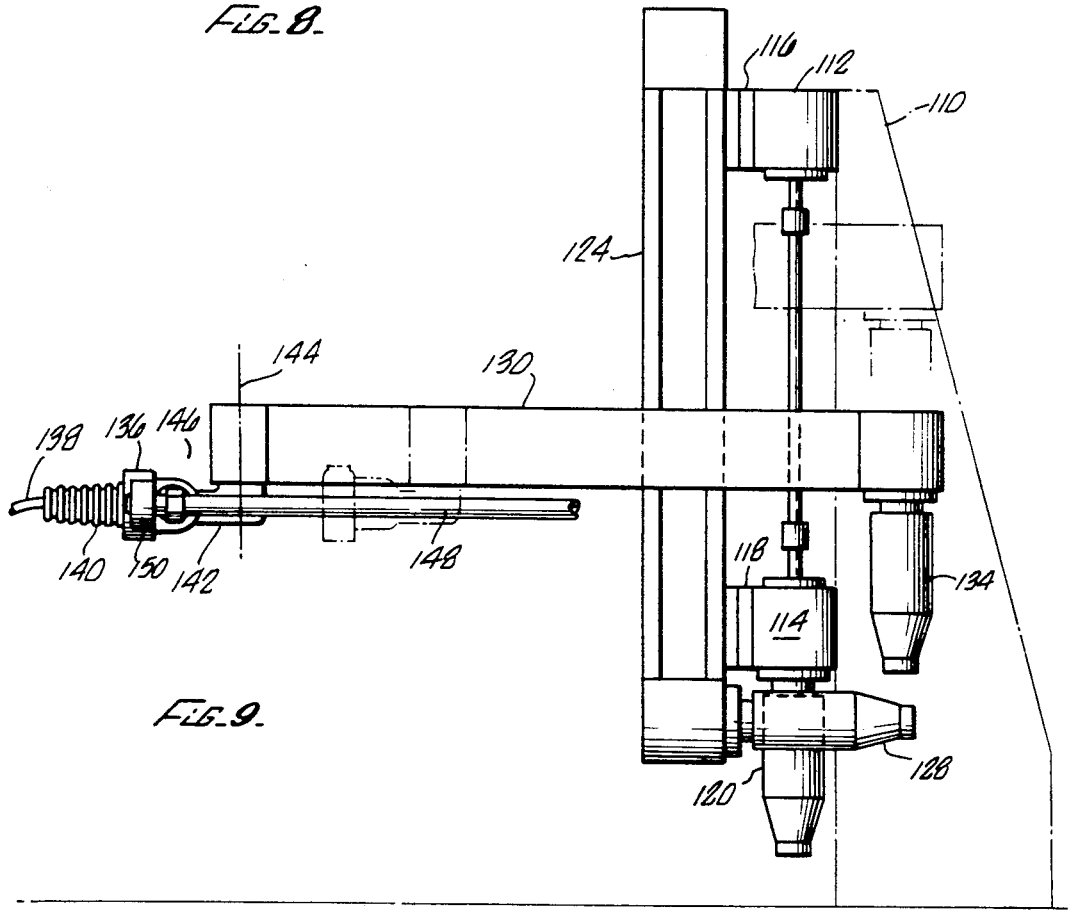
FIG. 9 is a side view of the system of FIG. 8.

An automatic delivery system is illustrated in FIGS. 8 and 9. The system includes a support defined by two support elements 108 and 110 which would be fixed to the floor of a fueling station. The support elements 108 and 110 are preferably mounted on an island or similar arrangement which prevents a vehicle from impacting against the structure when improperly driven to a parked position adjacent to the fueling system. Lines, markers or other location indicating devices may be employed to assist the driver in locating a vehicle such that it is appropriately positioned adjacent the fuel filling system for appropriate interaction with the delivery system.

Extending between the support elements 108 and 110 is a track conveyor. The track conveyor includes two parallel tracks 112 and 114. The parallel tracks 112 and 114 extend horizontally and are spaced apart a sufficient distance in the present embodiment such that the remaining mounting equipment can move unencumbered therebetween. Each track includes a mount 116 and 118 which may be driven along each respective track 112 and 114 of the track conveyor. At one end of the track conveyor, an electric motor 120 is mounted and coupled with the appropriate mechanisms within the tracks 112 and 114 to drive the mounts 116 and 118 therealong. A shaft coupling 122 allows simultaneous driving of both mounts 116 and 118 such that they remain vertically aligned. Track conveyors are available commercially which are suitable for the present application. One such track conveyor is available from Nook Industries, Inc.

Fixed to the mounts 116 and 118 is another track conveyor vertically oriented. This vertical track conveyor includes a track 124 and a mount 126. The mount 126 is similarly capable of being movably positioned along the track 124. Through horizontal movement of the mounts 116 and 118 and vertical movement of the mount 126, a rectangular range of movement is provided in a plane parallel to all of the tracks 112, 114 and 124. An electric motor 128 is coupled with and drives the mount 126.

A further track conveyor extends horizontally outwardly from the device. This conveyor includes a track 130 which is normal to all of the tracks 112, 114 and 124. Movably positioned on the track 130 is a mount 132. The mount 132 is directly fixed to the mount 126. Consequently, the track 130 rather than the mount 132 actually moves along its own length relative to the support elements 108 and 110. A motor 134 drives the device such that it projects toward or away from a vehicle having a fuel tank. This final track conveyor gives a third degree of freedom such that the range of movement of the device at the first end of the track 130 is both rectangular and extends outwardly toward and away from a vehicle.

Fixed at the first end of the track 130 is a fuel nozzle 136. The nozzle 136 is conventional in its triggering mechanism and basic configuration. A nozzle pipe 138 is slightly curved downwardly to allow drainage. Surrounding the nozzle is a resilient vapor return sleeve. The triggering mechanism may be activated by two or more pins which extend through the vapor return sleeve. When all pins are depressed toward the sleeve 140, the trigger is actuated. The release of any one or more pins would mechanically trip the trigger to shut the fuel flow off in a manner similar to that accomplished by the sensor which detects a full tank. The mounting 142 for the fuel nozzle 136 at the first end of the track 130 preferably includes a spring loaded pivotal mounting about axis 144. The mounting is sprung loaded to cause the nozzle to return to an aligned position. Also a horizontal axis through pin 146 similarly biased would permit a full range of movement of the fuel nozzle if a vehicle attempted to drive away without the device retracted. A hose 148 extends rearwardly under the track 130 to a spring loaded coil allowing freedom of movement of the system without involving loose hoses. The hose 148 includes the gasoline delivery tube, the vapor return line and an additive tube which may be used to delivery varying grades of gasoline by request through mixing at the nozzle.

Adjacent the nozzle 136, a sensor 150 is positioned to sense the optic element 106. The sensor 150 may be an active transmitter with the optic element 106 simply being a reflector. A signal is then received back by the sensor 150 to locate the fuel port. As an alternative, the optic element 106 may be an active transmitter of a signal received by the sensor 150. Conventional logic is then employed to drive the mechanism for proper placement of the nozzle for fueling.

In the preferred embodiment, it is believed that a substantial degree of freedom is necessary to supply most vehicles and to accommodate misalignment of the vehicle by its operator. To this end, the horizontal tracks 112 and 114 preferably accommodate a 48 inch movement horizontally of the system. The vertical track 124 accommodates a 24 inch movement while the outwardly extending horizontal track 130 accommodates a 24 inch movement. The system is set up such that the nozzle moves from a position 16 inches above the ground to a position 40 inches above the ground.

The input for operation of the fueling system may be by a station operator sitting at a console. Payment and fuel grade selection as well as actuation of the system could occur at that console. As an alternative, the driver may pull up to a console which extends outwardly to the drivers window. Under this circumstance, the driver could personally interact with the console to conduct the transaction. Finally, an onboard electronic storage and command system may be employed which would have a mobile console in the vehicle. The credit information may be stored in such a system. The driver would then activate his own mobile system, inputting the appropriate information and initiating the transaction. A data link would then be provided between the vehicle and the station. Such a data link may employ the optic element 106 and the sensor 150 such that digital information is passed from sensor to sensor.

Thus, a valve system and an automatic fuel filling system are disclosed for remote actuation on vehicles. Automatic or manual operation can be selected as necessary. The system contemplates employment as a retrofit on existing vehicles with minimum modification. Control over opening of the fuel tank is retained by the operator and the necessary operation for attaching a fuel filling system is limited to the location of the inlet without the requirement for opening doors or otherwise breaking seals and valves. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A valve system for automatic fuel delivery to a vehicle fuel tank, comprising
    an entry member positioned through the body of the vehicle and including a conical passage opening outwardly and extending to at least flush with the body of the vehicle;
    a valve body positioned inwardly of the vehicle body and attached to said entry member, said valve body having a passageway therethrough aligned with said conical passage;
    a valve member operatively positioned in said valve body to close said passageway;
    a vapor return passage through said valve body and communicating with said passageway adjacent said valve.

2. The valve system of claim 1 wherein said conical passage includes a lining of material forming a surface distinction form the vehicle body and the remainder of said entry member.

3. The valve system of claim 1 further comprising a brake light indicator located at a fixed position on said entry member which indicates the on and off status of a brake light of the vehicle.

4. The valve system of claim 1 wherein said valve member is slidably mounted in said valve body across said passageway.

5. The valve system of claim 4 wherein said valve member includes a hole therethrough which is substantially the same size as the cross section of said passageway.

6. The valve system of claim 1 wherein said vapor return passage is concentrically arranged about said valve body passageway.

7. The valve system of claim 1 further comprising
    a valve actuator including a switch located in the vehicle, an automatic actuator coupled with said valve member and controlled by said switch to open and close said passageway by said valve member.

8. The valve system of claim 7 wherein said valve actuator further includes a manual actuator coupled and parallel to said automatic actuator.

9. The valve system of claim 7 wherein said automatic actuator includes a pneumatic cylinder.

10. A valve system for automatic fuel delivery to a vehicle fuel tank, comprising
    an entry member positioned through the body of the vehicle and including a conical passage;
    a valve body positioned inwardly of the vehicle body and attached to said entry member, said valve body having a passageway therethrough aligned with said conical passage;
    a valve member operatively positioned in said valve body to close said passageway;
    a vapor return passage through said valve body and communicating with said passageway adjacent said valve;
    a valve actuator including a switch located in the vehicle, an automatic actuator coupled with said valve member and controlled by said switch to open and close said passageway by said valve member, said switch including a first, manually actuated switch and a second switch controlled by the vehicle ignition, said first and second switches being in series.

11. The valve system of claim 10 wherein said second switch is closed when said ignition switch is open.

12. A valve system for automatic fuel delivery to a vehicle fuel tank, comprising
    a fuel filler door on the body of the vehicle;
    an entry member positioned through said fuel filler door and including a conical passage;
    a valve body positioned inwardly of the vehicle body and attached to said entry member, said valve body having a passageway therethrough aligned with said conical passage;
    a valve member operatively positioned in said valve body to close said passageway;
    a vapor return passage through said valve body and communicating with said passageway adjacent said valve;
    a flexible hose connecting said passageway to the vehicle fuel tank, said flexible hose being capable of disconnection from said passageway with said fuel filler door open.

* * * * *